(12) United States Patent
Tang et al.

(10) Patent No.: US 10,386,121 B2
(45) Date of Patent: Aug. 20, 2019

(54) OPEN-LOOP THERMAL MANAGEMENT PROCESS AND SYSTEM

(71) Applicant: ADVANCED COOLING TECHNOLOGIES, INC., Lancaster, PA (US)

(72) Inventors: Xudong Tang, Lancaster, PA (US); Ehsan Yakshi-Tafti, Lancaster, PA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 413 days.

(21) Appl. No.: 14/519,323

(22) Filed: Oct. 21, 2014

(65) Prior Publication Data

US 2015/0107800 A1    Apr. 23, 2015

Related U.S. Application Data

(60) Provisional application No. 61/893,317, filed on Oct. 21, 2013.

(51) Int. Cl.
   *F28D 20/00*    (2006.01)
   *B01J 7/00*    (2006.01)
   *F28F 27/02*    (2006.01)

(52) U.S. Cl.
   CPC ............ *F28D 20/0056* (2013.01); *B01J 7/00* (2013.01); *F28D 20/003* (2013.01); *F28F 27/02* (2013.01);
   (Continued)

(58) Field of Classification Search
   CPC ....... F25B 17/12; B01J 7/00; F28D 2020/006; F28D 20/003; F28D 20/0056; F28F 27/02; Y02E 60/142
   See application file for complete search history.

(56) References Cited

U.S. PATENT DOCUMENTS 3,943,719 A * 3/1976 Terry ................. B01J 19/00
                                                 376/317
4,044,819 A * 8/1977 Cottingham ............ F01K 25/00
                                                 126/263.01
(Continued)

FOREIGN PATENT DOCUMENTS

EP          2442393 A1      4/2012
KR     20120050243 A  *   5/2012
WO       2013076105 A2      5/2013

OTHER PUBLICATIONS

Reilly, J. J., Wiswall, R. H., Jr., & Hoffman, K. C. (Jan. 25, 2006). Metal Hydrides as a Source of Hydrogen Fuel [Scholarly project]. In Argon National Laboratory. Retrieved Aug. 25, 2017, from www.anl.gov.*

(Continued)

*Primary Examiner* — Edward F Landrum
*Assistant Examiner* — Melodee Jefferson
(74) *Attorney, Agent, or Firm* — McNees Wallace & Nurick LLC (57) ABSTRACT

Open-loop thermal management systems and open-loop thermal management processes are disclosed. The process includes providing an open-loop thermal management system, saturating a reactor of the system with gas while a flow control unit prevents flow of the gas from the reactor, and maintaining a gas dissociation pressure range of the gas within the reactor. The system includes the reactor being arranged to receive a heat load. The reactor contains metal hydrides, metal organic framework, or a combination thereof. The reactor includes at least one venting line extending from the reactor. Also, the flow control unit is configured to adjustably control the flow of gas from the reactor to maintain the gas dissociation pressure range.

17 Claims, 3 Drawing Sheets

(52) U.S. Cl.
CPC ....... *F28D 2020/006* (2013.01); *Y02E 60/142* (2013.01)

(56) References Cited

U.S. PATENT DOCUMENTS

| | | | | |
|---|---|---|---|---|
| 4,165,952 A * | 8/1979 | Bennett | C02F 1/14 | 417/207 |
| 4,233,127 A * | 11/1980 | Monahan | B01J 19/127 | 204/157.5 |
| 4,262,739 A * | 4/1981 | Gruen | F03G 6/00 | 126/263.01 |
| RE30,840 E * | 1/1982 | Terry | F01K 25/00 | 60/644.1 |
| 4,393,924 A * | 7/1983 | Asami | F28D 20/003 | 165/104.12 |
| 4,424,771 A * | 1/1984 | Lovercheck | F02B 1/02 | 123/3 |
| 4,455,998 A | 6/1984 | Kroontje et al. | | |
| 4,499,864 A * | 2/1985 | Lovercheck | F02B 43/08 | 123/1 A |
| 4,548,044 A | 10/1985 | Sakai et al. | | |
| 4,555,395 A * | 11/1985 | Sirovich | C01B 3/0078 | 252/188.25 |
| 4,642,227 A * | 2/1987 | Flagan | B01J 6/008 | 118/716 |
| 4,666,999 A * | 5/1987 | Cook | B01J 8/1809 | 526/82 |
| 4,769,225 A * | 9/1988 | Reilly | C01B 3/0031 | 420/900 |
| 4,781,246 A | 11/1988 | Golben | | |
| 4,784,217 A | 11/1988 | Payre et al. | | |
| 4,816,121 A * | 3/1989 | Keefer | B21D 39/04 | 204/156 |
| 4,928,496 A * | 5/1990 | Wallace | C01B 3/0005 | 165/104.12 |
| 5,242,150 A * | 9/1993 | Shiffler | F16K 3/34 | 251/121 |
| 5,242,277 A * | 9/1993 | Bartlett | F04B 37/08 | 417/251 |
| 5,351,493 A | 10/1994 | Hiro et al. | | |
| 5,450,721 A * | 9/1995 | Golben | B01D 53/9454 | 60/274 |
| 5,477,706 A * | 12/1995 | Kirol | C09K 5/047 | 62/101 |
| 5,497,630 A | 3/1996 | Stein et al. | | |
| 5,630,933 A * | 5/1997 | Law | C23C 18/1637 | 205/210 |
| 5,768,906 A | 6/1998 | Tsenter | | |
| 5,867,978 A * | 2/1999 | Klanchar | C01B 3/065 | 165/169 |
| 6,342,198 B1 * | 1/2002 | Zaluska | C01B 3/0031 | 423/644 |
| 6,378,601 B1 | 4/2002 | Ovshinsky et al. | | |
| 6,485,853 B1 * | 11/2002 | Pettit | H01M 8/0612 | 429/412 |
| 6,593,017 B1 * | 7/2003 | Tan | C01B 3/065 | 252/188.26 |
| 6,709,497 B2 | 3/2004 | Myasnikov et al. | | |
| 6,823,931 B1 | 11/2004 | Stetson et al. | | |
| 6,860,923 B2 | 3/2005 | Myasnikov et al. | | |
| 6,899,862 B2 * | 5/2005 | Baldwin | B01J 7/02 | 423/657 |
| 6,946,104 B2 * | 9/2005 | Rusta-Sallehy | C01B 3/065 | 422/110 |
| 7,124,584 B1 | 10/2006 | Wetzel | F01K 25/065 | 60/641.2 |
| 7,191,858 B2 * | 3/2007 | Vanderwees | F01P 7/165 | 180/65.31 |
| 7,323,043 B2 | 1/2008 | Finamore | | |
| 7,363,965 B2 | 4/2008 | Myasnikov et al. | | |
| 7,581,698 B2 | 9/2009 | Hoehne et al. | | |
| 7,648,568 B2 * | 1/2010 | Arnold | F17C 1/14 | 502/526 |
| 7,867,300 B2 * | 1/2011 | Chellappa | B01J 19/249 | 423/237 |
| 7,958,873 B2 * | 6/2011 | Ernst | F02G 5/02 | 123/568.12 |
| 8,114,363 B1 * | 2/2012 | Golben | C10L 1/04 | 422/198 |
| 8,147,599 B2 | 4/2012 | McAlister | | |
| 8,430,154 B2 | 4/2013 | Yang et al. | | |
| 8,739,856 B2 * | 6/2014 | Fedorov | G06F 1/20 | 165/104.21 |
| 8,920,996 B2 * | 12/2014 | Skinkle | H01M 8/04014 | 429/433 |
| 9,123,925 B2 * | 9/2015 | Smith, Jr. | C01B 3/0026 | |
| 9,527,404 B2 * | 12/2016 | Gauthier | B60L 11/1874 | |
| 9,777,968 B1 * | 10/2017 | Vajo | F28D 20/003 | |
| 2003/0008145 A1 * | 1/2003 | Goldstein | B01J 31/1805 | 428/403 |
| 2003/0091876 A1 * | 5/2003 | Rusta-Sellehy | C01B 3/065 | 429/421 |
| 2004/0031390 A1 * | 2/2004 | Myasnikov | B01D 53/02 | 96/146 |
| 2004/0040316 A1 * | 3/2004 | Bradley | F17C 11/005 | 62/46.1 |
| 2004/0093874 A1 * | 5/2004 | Bradley | F17C 11/005 | 62/46.1 |
| 2004/0206237 A1 * | 10/2004 | Sherer | B01D 53/04 | 95/90 |
| 2004/0206241 A1 * | 10/2004 | Tempel | C01B 6/065 | 96/155 |
| 2005/0098035 A1 * | 5/2005 | Lemmon | C01B 3/001 | 95/116 |
| 2005/0274138 A1 * | 12/2005 | Golben | B60H 1/00585 | 62/480 |
| 2006/0057019 A1 * | 3/2006 | Young | C01B 3/0057 | 420/455 |
| 2006/0081483 A1 * | 4/2006 | Chen | B01D 53/02 | 206/0.7 |
| 2006/0204799 A1 * | 9/2006 | Ishikawa | B01D 53/0407 | 48/197 FM |
| 2007/0020175 A1 * | 1/2007 | Graham | C01B 3/065 | 423/658.2 |
| 2007/0163256 A1 * | 7/2007 | McDonald | F17D 1/04 | 60/597 |
| 2007/0205298 A1 * | 9/2007 | Harrison | F24D 11/0221 | 237/2 B |
| 2007/0212295 A1 * | 9/2007 | Woods | C01B 3/34 | 518/700 |
| 2008/0102011 A1 * | 5/2008 | Moalem | B01D 53/68 | 423/240 R |
| 2009/0119989 A1 * | 5/2009 | Withers-Kirby | B01J 19/0093 | 48/61 |
| 2010/0247426 A1 * | 9/2010 | Wallace | B01J 7/02 | 423/648.1 |
| 2010/0263711 A1 * | 10/2010 | Kanai | G05F 1/67 | 136/246 |
| 2010/0292631 A1 * | 11/2010 | Holden | A61F 9/00745 | 604/22 |
| 2011/0100356 A1 * | 5/2011 | Bliesner | F28D 20/003 | 126/618 |
| 2011/0120669 A1 * | 5/2011 | Hunt | F24J 2/07 | 165/67 |
| 2011/0303176 A1 * | 12/2011 | Hopkins | F17C 11/005 | 123/1 A |
| 2012/0055285 A1 * | 3/2012 | Mercuri | B82Y 30/00 | 75/362 |
| 2012/0195825 A1 * | 8/2012 | Koschany | B01J 8/009 | 423/657 |
| 2012/0227926 A1 | 9/2012 | Field et al. | | |
| 2012/0314829 A1 * | 12/2012 | Greene | F01K 3/00 | 376/322 |
| 2013/0251626 A1 * | 9/2013 | Wallace | B01J 7/02 | 423/657 |
| 2015/0253039 A1 * | 9/2015 | Erickson | F24J 1/00 | 126/714 |

(56) References Cited

U.S. PATENT DOCUMENTS

OTHER PUBLICATIONS

English Translation of Kim et al KR20120050243.*

* cited by examiner

OPEN-LOOP THERMAL MANAGEMENT PROCESS AND SYSTEM

CROSS-REFERENCE TO RELATED APPLICATION

This application claims priority to, and the benefit of, U.S. Provisional Patent Application No. 61/893,317, filed Oct. 21, 2013, entitled Open-Loop Thermal Management Process and System, which is hereby incorporated by reference in its entirety.

FIELD OF THE INVENTION

The present invention is directed to thermal management systems and processes. More particularly, the present invention relates to open-loop thermal management systems and processes.

BACKGROUND OF THE INVENTION

Electronics systems are often cooled by transporting heat to a remote location and using a fluid to dissipate the heat. Examples include natural convection, forced air convection, and pumped liquid convection. When a suitable heat sink is not available, the heat is stored instead. Typical applications where heat storage is necessary include, but are not limited to, low or no-pressure regions, such as space and the Earth's upper atmosphere, for example, in spacecraft thermal management (such as, during launch and re-entry).

Heat storage typically involves phase change, either from solid to liquid, or liquid to gas. The advantage of a phase change system is that the relatively large latent heat of the thermal storage material minimizes mass and volume of a thermal storage system. One disadvantage of most thermal storage materials is their low thermal conductivity. The system design generally must include features to boost the effective thermal conductivity.

A standard method of thermal storage uses a material that changes from a solid to a liquid as heat is applied. For example, a phase change material (PCM), typically either a paraffin wax, or a hydrated salt, is used. The system starts out with the PCM as a solid. As heat is applied, the PCM gradually melts, storing the heat. Typically the PCM is embedded in a metallic foam to improve the effective thermal conductivity. The PCM systems do not require a consumable and typically can be used for several thousand freeze/thaw cycles before they start to degrade. However, the PCM systems are limited by having a relatively large mass and volume.

Sublimators provide cooling via phase change to a gas, which can be vented, for example, to a low or no-pressure environment, such as space. The concept is based on flowing water into a porous media in a low pressure environment, allowing it to freeze, and removing heat based on the phase change from liquid (to solid) to gas. Working fluid from an existing coolant loop is sent through a heat exchanger where the heat is passed to a secondary loop of consumable fluid, typically water. The water is exposed through a porous plate to the ambient which must be below the triple point of the water (273.16 K and a partial vapor pressure of 611.73 Pa). The water freezes on the porous plate and creates a solid boundary that separates the working fluid from the low-pressure environment. This separation prevents water from simply boiling off to a low or no-pressure environment, such as space. Heat from the primary coolant loop is transferred into the water and sublimates the ice on the wick with the resulting vapor being released to a low or no-pressure environment, such as space. Pressure in the water loop is maintained by a feedwater tank, and whenever a path clears from the ice sublimating away in the porous plate, more water flows in and freezes. Unlike the PCM thermal storage discussed above, sublimators use a consumable liquid, and must contain enough fluid for the entire energy that must be removed.

Also, sublimators do not have 100% utilization because, in practice, more water is actually used than should be needed. The inefficiency may come from unaccounted heat leaks into the system sublimating more of the water and/or start-up and shut-down losses for transient heat loads, which occurs because sublimators are designed and sized for steady-state operation. Sublimators efficiently reject heat but operate only at the triple point, which is colder than the desired operating temperature for a low or no-pressure environment, such as space. Operation at higher temperatures would result in continually starting and stopping the sublimator, thereby wasting water. In addition, the sublimator requires a constant pressure feedwater source to maintain operation, which may require a passive tank and bladder or require expensive low or no-pressure environment rated pumps.

Open-loop thermal management systems and open-loop thermal management processes that do not suffer from one or more of the above drawbacks would be desirable in the art.

BRIEF DESCRIPTION OF THE INVENTION

In an exemplary embodiment, an open-loop thermal management process includes providing an open-loop thermal management system, saturating a reactor of the system with gas while a flow control unit prevents flow of the gas from the reactor, and maintaining a gas dissociation pressure range of the gas within the reactor. The system includes the reactor being arranged to receive a heat load. The reactor contains a medium having metal hydrides, metal organic framework, or a combination thereof. The reactor includes at least one venting line extending from the reactor. Also, the flow control unit is configured to adjustably control the flow of gas from the reactor to maintain the gas dissociation pressure range.

In another exemplary embodiment, an open-loop thermal management process includes providing an open-loop thermal management system, saturating a reactor in the system with hydrogen while preventing flow of the hydrogen from the reactor, then adjusting the flow control unit to release the gas from the at least one venting line, and maintaining a hydrogen dissociation pressure range of the hydrogen within the reactor. The reactor is arranged to receive a heat load. The reactor contains copper-plated nanocrystalline metal hydrides. At least one venting line extends from the reactor. The flow control unit is configured to adjustably control the flow of hydrogen from the reactor.

In another exemplary embodiment, an open-loop thermal storage system includes a reactor arranged to receive a heat load, the reactor containing a medium having metal hydrides, metal organic framework, or a combination thereof. The system further includes at least one venting line extending from the reactor and a flow control unit on the venting line. The flow control unit is configured to adjustably control the flow of gas from the reactor by way of the venting line and maintain a gas dissociation pressure range of the gas within the reactor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are open-loop thermal management systems and processes, for example, in a low or no pressure device, an outer-space-bound device, a fuel cell, a vehicle, or a combination thereof. Embodiments of the present disclosure, in comparison to similar systems and processes failing to include one or more of the features disclosed herein, for example, permit higher heat storage capacity for smaller volume reactors (for example, greater heat storage density), permit thermal storage in conditions with internal reactor pressure being consistently maintained above ambient pressure, permit on-demand cooling, permit precise temperature control, permit passive operation (for example, without using a compressor and/or pump), permit delivery of hydrogen venting at a constant or substantially constant pressure over a composition range, permit increased efficiency, permit operation on the ground and/or at any elevation, permit other suitable advantages, or a combination thereof.

Figure 1:
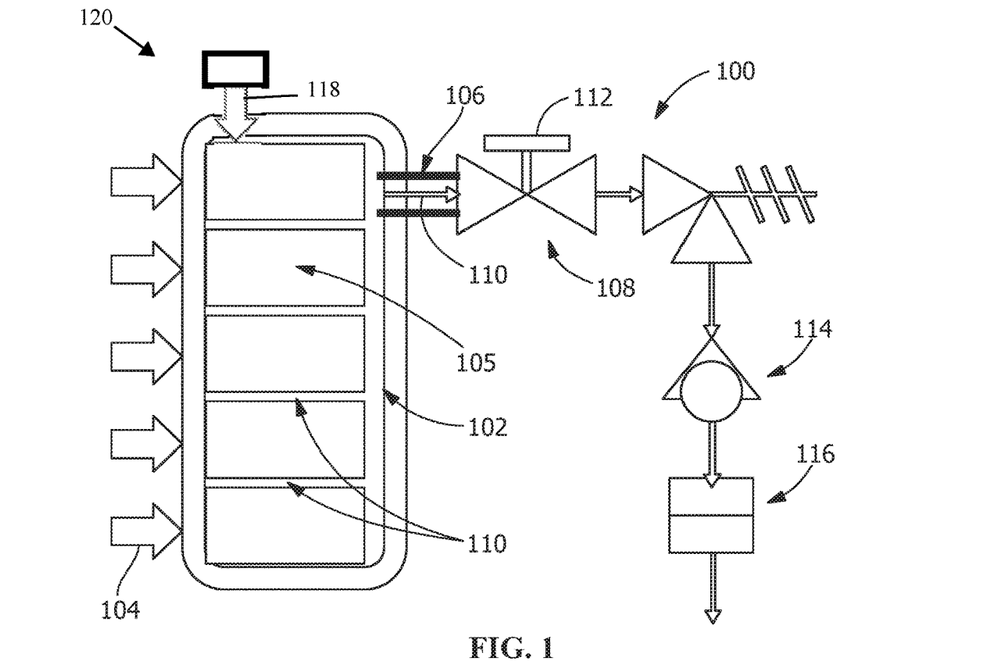
FIG. 1 is a schematic view of a first embodiment of an open-loop thermal management system performing a first embodiment of an open-loop thermal management process, according to the disclosure.

FIG. 1 schematically depicts an open-loop thermal management system 100 during an open-loop thermal management process, according to an embodiment. The system 100 includes a reactor 102 arranged to receive a heat load 104, for example, as thermal storage. In one embodiment, the system 100 absorbs or releases the heat load 104 by a medium 105 operating upon a hydriding-dehydriding reaction as follows:

where M is the formula for the medium 105, x is a non-stoichiometric constant and $\Delta H_f$ is the hydride formation heat.

The absorbing of the hydrogen (i.e., hydriding) is exothermic and the releasing of the hydrogen (i.e., dehydriding) is endothermic. Based upon this, in one embodiment, the medium 105 is capable of absorbing large amounts of hydrogen via exothermic surface chemisorption and subsequent hydriding reactions. When the heat load 104 is applied to the reactor 102, absorbed hydrogen is released from the medium 105, thereby absorbing the heat load 104. For example, in one embodiment, one mole of $H_2$ gas is released from the medium 105, thereby permitting the medium 105 to absorb 25 to 35 kJ of the heat load 104.

The capacity of absorbing the heat load 104 is dependent upon the medium 105 used. The medium 105 is or includes metal hydrides (for example, nanocrystalline metal hydrides and/or the copper-plated metal hydrides), a metal organic framework, or a combination thereof. Suitable metal hydrides include, but are not limited to, lanthanum-based hydrides (for example, based upon $LaNi_5$), magnesium-based hydrides (for example, $MgH_2$), calcium-mischmetal hydrides (for example, $Ca_{0.7}Mm_{0.4}Ni_5$), other suitable materials, or a combination thereof. The metal hydrides have higher volumetric heat storage capacity than phase change materials. For example, $LaNi_5$ has a theoretical heat storage capacity of 1,200 kJ/liter, compared to paraffin wax (a phase change material) that has a heat storage capacity between 160 kJ/liter and 200 kJ/liter.

In one embodiment, the hydriding-dehydriding reaction operates based upon a gas dissociation pressure range of a gas 110 that is released during the absorbing of the heat load 104 by the medium 105. In one embodiment, the gas dissociation pressure range is defined by a pressure-hydrogen concentration temperature curve for the medium 105. For example, at a given temperature, a metal hydride forms condensed phases (β-phase) with the hydrogen in the presence of a partial pressure of hydrogen. In one embodiment, equilibrium behavior of the metal hydride in a plateau region of a plot of the absolute equilibrium absorption or desorption pressure as a function of hydrogen concentration for an isotherm is described with the following reaction:

$$\ln[P_{eq}(\text{atm})] = \frac{\Delta H}{RT} - \frac{\Delta S}{R}$$

where $P_{eq}$ is the hydrogen gas dissociation pressure, R is the molar gas constant, T is the temperature, $\Delta H$ is the heat of formation, and $\Delta S$ is the standard entropy of formation. The plateau region is defined by endpoints, $H/M_\alpha$ and $H/M_\beta$, which are phase limits of the plateau region based upon a transition from α to β phases, where H is a hydrogen atom and M is a metal atom in the medium 105.

In one embodiment, the medium 105 is selected by considering hysteresis of the hydriding-dehydriding reaction. The dehydriding occurs at a pressure below the hydriding, despite the general reversibility of the hydriding-dehydriding reaction, for example, due to irrecoverable energy loss associated with volume changes during the hydriding-dehydriding reaction.

Figure 3:
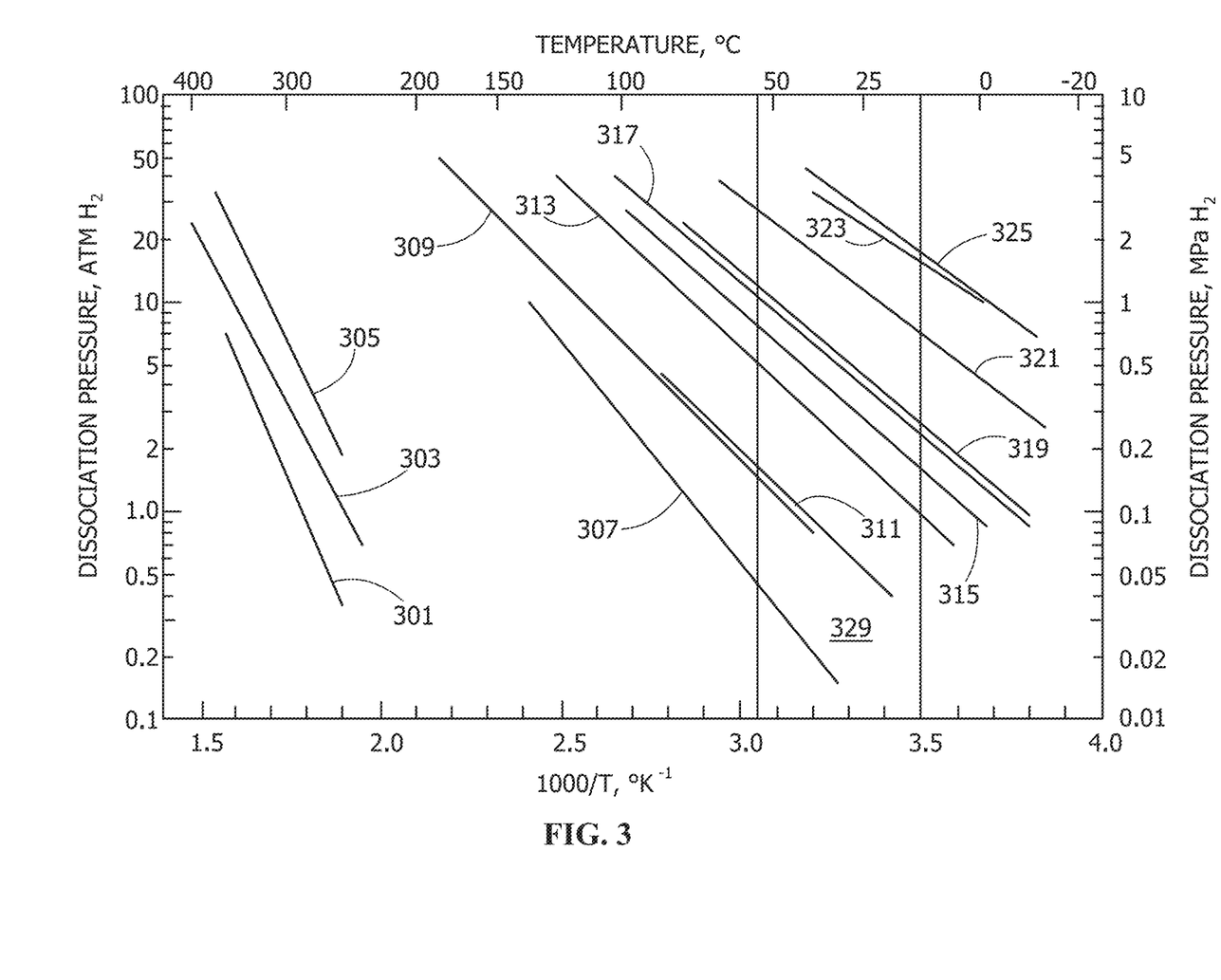
FIG. 3 a graph of properties for a medium for a reactor of an embodiment of an open-loop thermal management system for performing an embodiment of an open-loop thermal management process, according to the disclosure.

In one embodiment, the medium 105 is selected by having a mid-point on the plateau that falls within a predetermined pressure-temperature range. For example, referring to FIG. 3, in one embodiment, suitable materials for the medium 105 include, but are not limited to, $MgH_2$ 301, $Mg_2Ni$ 303, $Mg_2Cu$ 305, $Fe_{0.8}Ni_{0.2}H_{0.6}$ 307, $LaNi_{4.7}Al_{0.3}H_3$ 309, $CaNi_5H_3$ 311, $LaNi_5H_3$ 313, $Fe_{0.9}Mn_{0.1}TiH$ 315, $MNi_{4.5}Al_{0.5}H_3$ 317, FeTiH 319, $MNi_{4.15}Fe_{0.85}H_3$ 321, $MNi_5H_3$ 323, $Ca_{0.2}M_{0.8}Ni_5H_3$ 325, or a combination thereof, having desorption pressures at the mid-point of the corresponding plateaus shown in the van't Hoff plots of FIG. 3. In a further embodiment, the medium 105 is selected to include materials falling within the pressure temperature range 329 shown in FIG. 3 or any suitable range or sub-range based upon that which is disclosed in FIG. 3. For example, such materials include, but are not limited to, the $Fe_{0.8}Ni_{0.2}H_{0.6}$ 307, the $LaNi_{4.7}Al_{0.3}H_3$ 309, the $CaNi_5H_3$ 311, the $LaNi_5H_3$ 313, the $Fe_{0.9}Mn_{0.1}TiH$ 315, the $MNi_{4.5}Al_{0.5}H_3$ 317, the $FeTiH$ 319, the $MNi_{4.15}Fe_{0.85}H_3$ 321, the $MNi_5H_3$ 323, and the $Ca_{0.2}M_{0.8}Ni_5H_3$ 325. Further embodiments include the material having dissociation pressure in MPa being above a pressure, such as, above 0.01, above 0.02, above 0.05, above 0.1, or above 0.2. In one embodiment, the minimum dissociation pressure is set by the atmospheric pressure at the minimum operating level. For example, a dissociation pressure above atmospheric pressure (for example, about 0.1 MPa) allows the system 100 to function on the ground.

In one embodiment, the medium 105 includes augmented hydride materials having increased hydrogen/heat storage capacity by weight and/or increased absorption/desorption kinetics, in comparison to conventional polycrystalline hydride materials. Such augmented hydride materials have modified properties attributable to the formation of nanocrystalline structures using non-equilibrium processing techniques, such as mechanical alloying or high-energy ball-milling. For example, in one embodiment, the medium 105 includes nanocrystalline $LaNi_5$-type metal hydrides that, in comparison to polycrystalline $LaNi_5$-type metal hydrides, have higher storage capacity, more stable temperature-pressure cycling capacity during the life-time of the system 100, lower hysteresis, and better corrosion stability.

Figure 4:
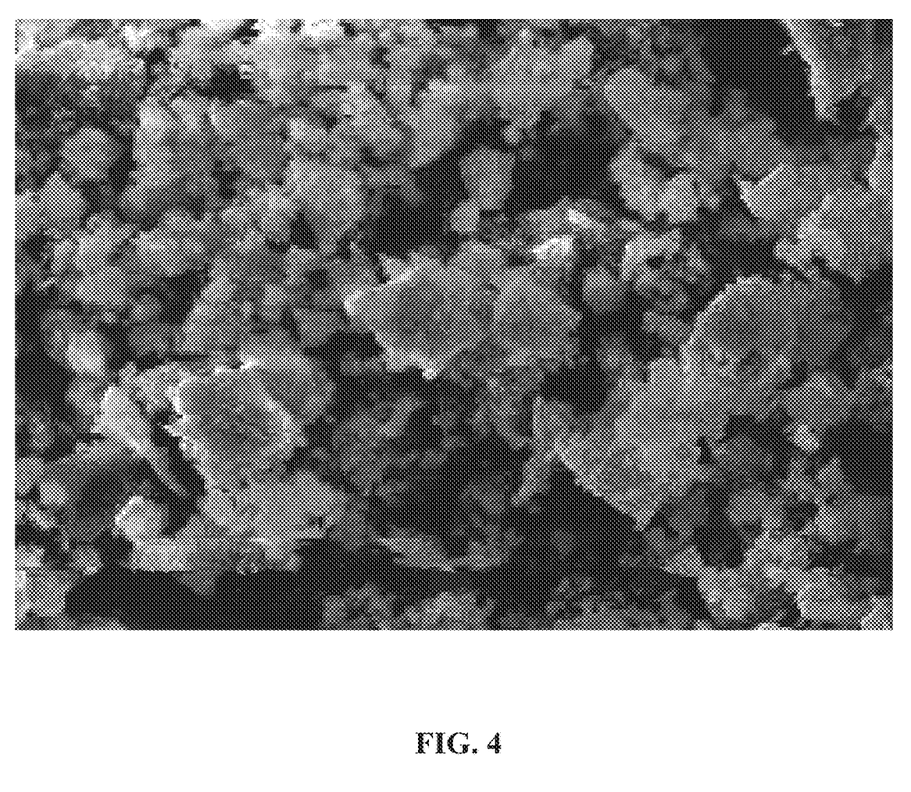
FIG. 4 is a scanning electron micrograph of a ball-milled medium for a reactor of an embodiment of an open-loop thermal management system for performing an embodiment of an open-loop thermal management process, according to the disclosure.

In one embodiment, the medium 105 includes $MgH_2$-type metal hydrides that are ball-milled. The $MgH_2$-type metal hydrides have surface and morphology of Mg particles that are rough and irregular, as shown in the scanning electron micrograph of FIG. 4. The surface and the morphology form smaller catalyst particle clusters covering larger Mg particles, providing a surface area and effective grain boundaries of $MgH_2$-type metal hydrides that are significantly greater than $MgH_2$-type metal hydrides that are not ball-milled, resulting in enhanced sorption kinetics by providing an increased number of reactive sites. In one embodiment, the smaller catalyst particles have a maximum dimension of between 0.2 and 2 microns and the larger catalyst particles have a maximum dimension of between 5 and 10 microns, for example, at a ratio of about 10 to 1.

In one embodiment, the medium 105 includes material resistant to decrepitation/pulverization caused by volume changes due to the hydriding-dehydriding reaction. The material is formed, for example, by coating a powder particle with a layer of a non-powder material. In one embodiment, the non-powder material is a copper layer, for example, applied by a plating technique, such as electroless plating. In one embodiment, the powder particle has thermal conductivity (for example, an effective thermal conductivity=~$10^{-1}$ W/m-K) that is lower than the non-powder material. The micro-encapsulation of the powder particle with the non-powder material allows the decrepitated metal hydride particles to be contained inside a thin shell of the non-powder material even after many cycles of the hydriding-dehydriding reaction. In one embodiment with the non-powder material, the medium 105 has a thermal conductivity that is increased to 3 to 5 W/m-K and/or by 50 times through the coating.

To achieve the hydriding-dehydriding reaction, the reactor 102 includes at least one venting line 106 extending from the reactor 102 and a flow control unit 108 on the venting line 106. The flow control unit 108 is configured to adjustably control the flow of the gas 110 from the reactor 102. The gas 110 is or includes hydrogen, carbon dioxide, nitrogen, other suitable gases, or a combination thereof.

The system 100 maintains the gas dissociation pressure range of the gas 110 within the reactor 102. Staying within the gas dissociation pressure range is achieved, for example, by the flow control unit 108 preventing flow of the gas 110 and/or being adjusted to release the gas 110 from the venting line(s) 106 and, thus, the reactor 102.

The adjusting of the flow control unit 108 is by an electronic throttling valve 112, is passive, or is achieved by any other suitable technique. In one embodiment, the adjusting of the flow control unit 108 is in response to temperature and/or pressure values within the reactor 102. In one embodiment, the system 100 includes a check valve 114 adjustable in response to ambient pressure being greater than the gas dissociation pressure range.

Figure 2:
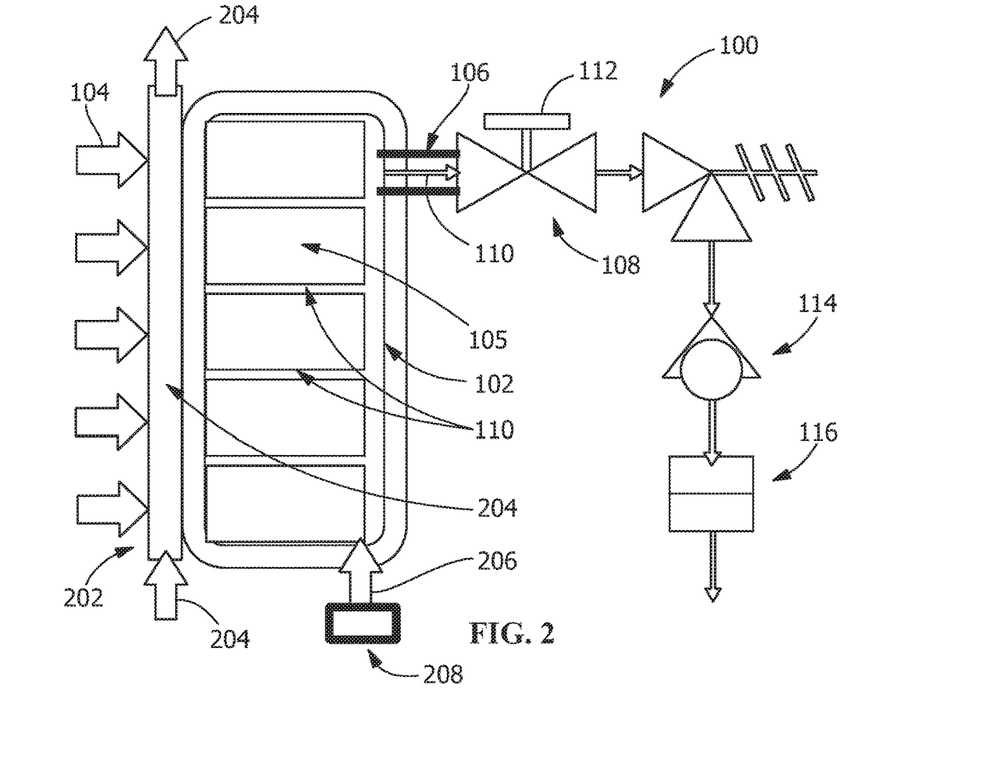
FIG. 2 is a schematic view of a second embodiment of an open-loop thermal management system performing a second embodiment of an open-loop thermal management process, according to the disclosure.

The system 100 includes any other suitable features. For example, in one embodiment, the system includes a rupture device 116 for preventing ambient air from entering the reactor 102, the venting line(s) 106, the flow control unit 108, the check valve 114, other suitable components, or a combination thereof. In another embodiment, as is shown in FIG. 2, the system 100 includes a heat transfer device 202, such as a coolant path for coolant 204. The coolant 204 cools the heat load 104, for example, prior to the reactor 102 receiving the heat load 104 and/or while the reactor 102 receives the heat load 104 (to prevent overheating of the system 100 during the exothermic reaction). The coolant 204 is used in embodiments with the ambient temperature and/or pressure causing the reactor 102 to exceed the gas dissociation pressure range. In one embodiment, the heat transfer device 202 or cold plate is maintained at a temperature of between 10° C. and 15° C. for a period, for example, between 10 minutes and 1 hour.

The system 100 is configured for a single depletion of the saturation of the reactor 102 of initially received gas 118 from a gas supply 120 or re-saturating of the reactor 102, for example, after the gas 110 flows from the reactor 102. As shown in FIG. 2, in one embodiment, the reactor 102 receives additional gas 206 from a gas supply source 208 after the saturating of the reactor 102, a release of the gas 110, an absorption of the gas 110, or a combination thereof. In further embodiments, the introducing of the gas 110 is at a rate that is slower than the release of the gas 110.

The system 100 absorbs and releases the heat load 104 based upon any suitable operational procedures. In one embodiment, the heat load 104 is absorbed during higher power operation, the gas 110 is released, and then the medium 105 is recharged/re-saturated, for example, at a slower rate than the absorbing and/or the releasing of the gas 110, allowing the reactor 102 to have a size that corresponds to an average of the heat load 104 instead of a maximum heat load. Such properties relating to the size permit the system 100 to be used in small, remote operation, and/or temporarily remote, for example, low or no-pressure devices, such as, outer-space-bound devices.

EXAMPLE

In one example, the hydriding-dehydriding reaction is compared to a phase change material. Use of the phase change material includes using a paraffin wax (Rubitherm 82 from Rubitherm Technologies, Berlin, Germany), which melts at a temperature of about 82° C. To absorb a heat flow of 3 kW for 45 seconds (0.135 MJ), the phase change material requires a reactor capable of holding 1.5 kg and 2.0 liters of the paraffin wax. In contrast, to absorb the same heat flow, the hydriding-dehydriding reaction is capable of using 0.78 kg and 0.13 liters of the metal hydride $LaNi_5$. Thus, the hydriding-dehydriding reaction permits lower mass and lower volume for identical thermal storage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An open-loop thermal management process, comprising:
providing an open-loop thermal management system, comprising a reactor arranged to receive a heat load, the reactor containing a medium having metal hydrides, a metal organic framework, or a combination thereof, at least one venting line extending from the reactor and venting from the open-loop thermal management system, and an electronic throttling valve on the at least one venting line, the electronic throttling valve adjustably controlling a flow of gas from the reactor by way of the at least one venting line, the metal hydrides, the metal organic framework, or the combination thereof operating upon a hydriding-dehydriding reaction; then
saturating the medium with the gas by absorption of the gas into the medium while the electronic throttling valve prevents flow of the gas from the reactor;
maintaining a gas dissociation pressure range of the gas within the reactor; and then
applying the heat load to the reactor, the gas absorbed by the medium being released from the medium and through the at least one venting line, thereby absorbing the heat load.

2. The process of claim 1, further comprising adjusting the electronic throttling valve to release the gas from the at least one venting line.

3. The process of claim 2, wherein the maintaining of the gas dissociation pressure range is performed by the adjusting of the electronic throttling valve between the preventing of the flow of the gas and the releasing of the gas.

4. The process of claim 3, wherein the adjusting of the flow is in response to temperature and pressure values within the reactor.

5. The process of claim 1, further comprising releasing the gas from the reactor and then re-saturating the medium.

6. The process of claim 1, wherein the heat load contacts a coolant prior to the reactor receiving the heat load.

7. The process of claim 2, further comprising introducing an additional amount of the gas to the reactor from a gas supply after the saturating of the medium, after the releasing of the gas, after the absorption of the gas, or a combination thereof.

8. The process of claim 7, wherein the introducing of the additional amount of the gas is at a rate that is slower than the release of the gas.

9. The process of claim 1, wherein the gas is hydrogen, carbon dioxide, or nitrogen.

10. The process of claim 1, wherein the reactor contains the metal hydrides and the metal hydrides include nanocrystalline metal hydrides.

11. The process of claim 1, wherein the reactor contains the metal hydrides and the metal hydrides are copper-plated.

12. The process of claim 1, wherein the reactor contains the metal hydrides and the metal hydrides include lanthanum-based hydrides, magnesium-based hydrides, calcium-mischmetal, or a combination thereof.

13. The process of claim 1, wherein the metal hydrides, the metal organic framework, or the combination thereof receives a plurality of atoms from the gas by exothermic absorption.

14. The process of claim 1, wherein the medium absorbs at least 25 kJ of the heat load in response to 1 mole of the gas being released, absorbed, or a combination thereof.

15. The process of claim 1, wherein the process occurs outside the Earth's atmosphere.

16. An open-loop thermal management process, comprising:
providing an open-loop thermal management system, comprising a reactor arranged to receive a heat load, the reactor containing a medium of copper-plated nanocrystalline metal hydrides, at least one venting line extending from the reactor and venting from the open-loop thermal management system, and an electronic throttling valve on the at least one venting line, the electronic throttling valve being configured to adjustably control a flow of hydrogen from the reactor, the medium operating upon a hydriding-dehydriding reaction; then
saturating the medium with the hydrogen by absorption of the hydrogen into the medium while the electronic throttling valve prevents the flow of the hydrogen from the reactor; then
applying the heat load to the open-loop thermal management system, the hydrogen absorbed by the copper-plated nanocrystalline metal hydrides being released from the copper-plated nanocrystalline metal hydrides, thereby absorbing the heat load; then
adjusting the electronic throttling valve to release the hydrogen through the at least one venting line; and
maintaining a hydrogen dissociation pressure range of the hydrogen within the reactor.

17. An open-loop thermal storage system, comprising:
a reactor arranged to receive a heat load, the reactor containing a medium having metal hydrides, a metal organic framework, or a combination thereof, the medium being saturated with a gas by absorption of the gas into the medium;
a gas supply supplying the gas to the reactor;
a heat transfer device arranged to cool the heat load prior to the reactor receiving the heat load;
at least one venting line extending from the reactor and venting from the open-loop thermal storage system; and
an electronic throttling valve on the at least one venting line, the electronic throttling valve being configured to adjustably control a flow of gas from the reactor through the at least one venting line;
wherein the metal hydrides, the metal organic framework, or the combination thereof operate upon a hydriding-dehydriding reaction such that the heat load is received by the gas by desorption of the gas from the medium.

\* \* \* \* \*